April 6, 1965
J. A. KATER
3,177,415
HERMETICALLY SEALED CAPACITOR
Filed Dec. 18, 1959
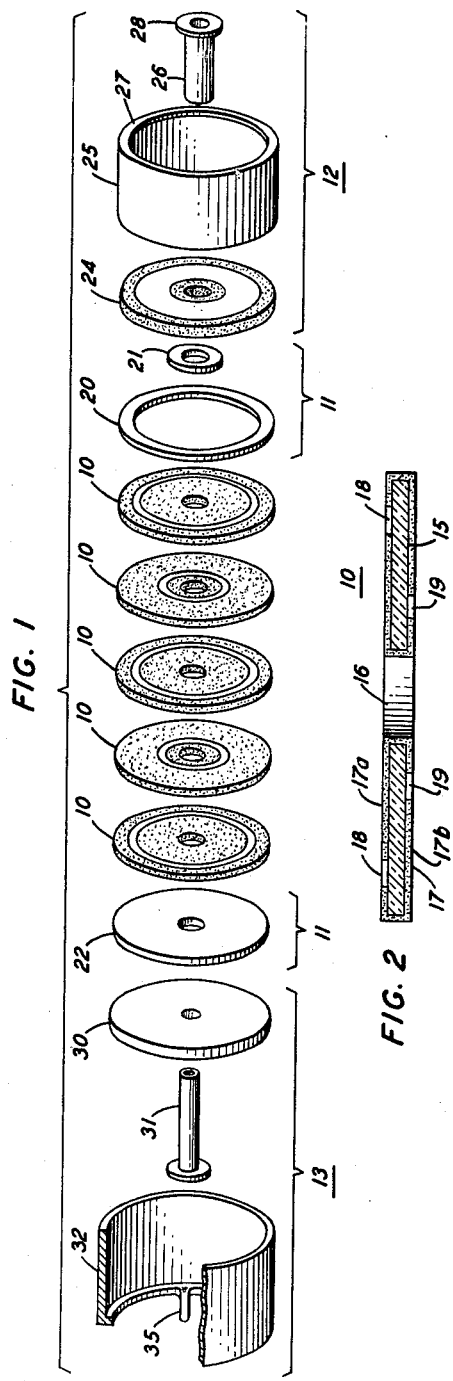
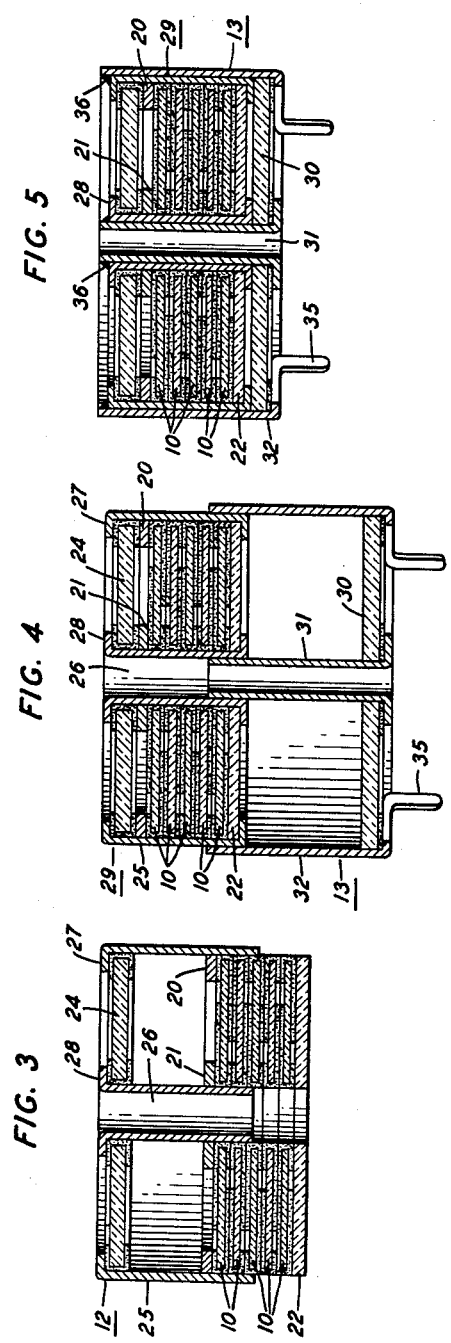
INVENTOR
J. A. KATER
BY John C. Morris
ATTORNEY United States Patent Office 3,177,415
Patented Apr. 6, 1965

3,177,415
HERMETICALLY SEALED CAPACITOR
Joseph A. Kater, Haverhill, Mass., assignor to Bell Telephone Laboratories, Incorporated, New York, N.Y., a corporation of New York
Filed Dec. 18, 1959, Ser. No. 860,505
4 Claims. (Cl. 317—261)

This relates to the capacitors and particularly to capacitors adapted for high frequency applications.

Patent 2,348,693 issued to B. B. Minnium on May 9, 1944, discloses a capacitor comprising a stack of metalized dielectric plates having a central aperture extending therethrough. The metalizing on each plate is continuous over its entire surface except for a single interruption on each of its faces, thereby forming a capacitive element consisting of two electrically conductive members separated by a dielectric member. An inner conductive member extending through the central aperture in the plates is electrically connected to the metalized surfaces around the aperture and provides the high potential terminal of the capacitor. An outer conductive member surrounding the plates is electrically connected to the metalized surfaces on the periphery of the plates and provides the other terminal of the capacitor. This design permits the current to fan out in a 360 degree pattern from the center terminal, thereby providing the shortest possible electrical path between the center terminal and the outer terminal. This design furthermore provides a compact capacitor having relatively heavy and short terminals. These two factors result in a minimum internal impedance which is important for high frequency applications.

It is often necessary for a capacitor to perform effectively under other than ordinary temperature and humidity conditions. It is therefore desirable that the capacitor be hermetically sealed so that the penetration of moisture and other contaminants is prevented. Heretofore, however, hermetically sealed capacitors of the Minnium type have been obtained through the use of compression type glass seals. This construction requires the utilization of a center terminal of increased length and thereby results in an increase in impedance that makes such a hermetically sealed capacitor unsuitable for some high frequency applications.

An object of this invention is to provide a hermetically sealed capacitor suitable for all high frequency applications.

Specifically, an object of this invention is to provide a hermetically sealed capacitor having exceptionally low impedance.

Another object of this invention is to provide a capacitor of this type that can be fabricated economically.

These and other objects of this invention are achieved in an illustrative embodiment thereof wherein the capacitor includes capacitive elements consisting of apertured metalized dielectric plates. The capacitive elements are enclosed within a metal and ceramic envelope that consists of two sections, each section comprising a metalized ceramic disk hermetically secured at a high temperature to both a metal shell and a metal eyelet. The capacitive elements are placed within a first section of the envelope, and edges of the envelope are flanged over, securing the capacitive elements within this section of the envelope and pressing the metalized plates together so as to form a good electrical contact between the individual elements and between the elements and the envelope. The first section of the envelope is then placed within the second section of the envelope, and exposed adjacent metal surfaces of the two sections are secured together at low temperatures to complete the hermetic seal.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purposes of illustration and description and is not to be construed as defining the limits of the invention.

In the drawing:

FIG. 1 is an exploded perspective of the capacitor of this invention;

FIG. 2 is a cross sectional view of a capacitive element;

FIG. 3 is a cross sectional view showing the capacitive elements of the capacitor being received by a first section of the envelope;

FIG. 4 is a cross sectional view showing the capacitive elements assembled within the first section of the envelope and the first section being received by the second section of the envelope; and FIG. 5 is a cross-sectional view of the completely assembled capacitor.

Referring to the drawings and particularly to FIG. 1, the capacitor comprises a plurality of capacitive elements 10, separating members 11, a first envelope section 12, and a second envelope section 13. As shown in FIG. 2, each capacitive element comprises a thin plate of a dielectric material 15, such as mica, having a central aperture 16 of a certain diameter extending therethrough. The inner and outer edges and the faces of the plate are coated, as by electroplating, with a good electrically conductive material 17, such as silver. The continuity of the conductive coating is interrupted on one face of the plate, as at 18, a short distance from the outer edge, while the continuity of the conductive coating is interrupted on the other face, as at 19, a short distance from the inner edge. The interruptions provide, in effect, two electrically conductive elements 17a and 17b separated by a dielectric element 15.

As illustrated in FIG. 3, the number of capacitive elements 10 necessary to give the capacitor the desired capacity are stacked so that the apertures therein are in register and the conductive surfaces on adjoining faces are in engagement. Metal washers 20 and 21 and an apertured dielectric plate 22, which comprise the separating members 11, are respectively placed at the top and the bottom of the stack. The apertures in the washer 21 and the plate 22 are of approximately the same diameter as the apertures in the capacitive elements, and the outside diameter of the washer 20 and the plate 22 is approximately the same as the outside diameter of the capacitive elements.

The capacitive elements 10 and the separating members 11 are received by the first envelope section 12, which comprises a centrally apertured plate 24, a shell 25, and an eyelet 26. The shell and eyelet are respectively provided with flange portions 27 and 28 at one end thereof which abut against the plate when the three members are assembled in the manner shown in FIG. 3, and the plate, shell, and eyelet are dimensioned so that when they are so assembled, the envelope section fits easily over the capacitive elements and separating members. The shell and the eyelet are formed from an electrically conductive material, such as brass, and the plate consists of a refractory dielectric material, such as ceramic. The plate is metalized around the aperture therein and around the periphery thereof with a material that wets both metallic and refractory dielectric materials and has a high temperature melting point, that is, a melting point above the melting point of the standard soft solders as defined by the American Society for Testing Materials, specification B32–46T. Several such wetting materials and the manner in which they are applied to a refractory dielectric body are disclosed in Patent 2,570,248 issued to F. C. Kelley on October 9, 1951. The metalized surfaces of the plate that are contiguous with surfaces of the eyelet and shell are joined thereto at the high temperature necessary to melt the metalizing material by any of the known brazing or soldering processes, forming a hermetic seal therebetween.

With the capacitive elements 10 and separating members 11 placed within the first envelope section 12, the lower end of the envelope section is flanged over as shown in FIG. 4, securing the capacitive elements and the separating members therewithin and pressing them together so as to make a good electrical contact between the individual capacitive elements and between the elements and the envelope. The subassembly 29 thereby formed is placed into the second envelope section 13 which, like the first envelope section, comprises a centrally apertured plate 30, an eyelet 31, and a shell 32. The plate, eyelet, and shell are shaped similar to and formed from the same material as the corresponding parts in the first envelope section, and they are joined together in the same manner. The only differences are that the plate 30 is only metalized on portions of one of its faces and the shell 32 is provided with tabs 35 to which electrical connection can be made. The plate, eyelet, and shell are dimensioned so that, as illustrated in FIG. 5, the second envelope section fits easily over the subassembly 29. A final seal 36 is made as by soldering along the upper adjoining edges of the subassembly 29 and the second envelope section 13 to complete the hermetic seal around the capacitive elements. The seal 36 is formed at a low temperature, that is, a temperature in the range of the melting points of soft solders, so as not to disturb the high temperature seals of the envelope sections.

Although but one embodiment of the invention has been illustrated and described in detail, it is to be expressly understood that the invention is not limited thereto. Various changes can be made in the design and arrangement of the parts without departing from the spirit and the scope of the accompanying claims.

What is claimed is:

1. In a hermetically sealed capacitor, capacitive means comprising a centrally apertured dielectric plate, a conductive coating covering the surface of said plate, the coating being continuously interrupted on one face of the plate a spaced distance from the outer edge and continuously interrupted on the other face of the plate a spaced distance from the inner edge, the interruptions providing two electrically conductive elements separated by a dielectric element, a first envelope section for encasing said capacitive means comprising a first apertured refractory dielectric plate superimposed on said capacitive means, a first conductive shell surrounding said capacitive means and said dielectric plate, and a first conductive tube extending through the aperture in said capacitive means and said dielectric plate, said shell and tube being hermetically joined to said dielectric plate, the ends of said shell and tube remote to said dielectric plate being flanged over to electrically connect said shell to one conductive element and said tube to the other conductive element of said capacitive means, and a second envelope section for encasing said first envelope section comprising a second apertured refractory dielectric plate superimposed on said flanged over end of said first envelope section, a second conductive shell surrounding said first conductive shell, and a second conductive member inserted within said first conductive tube, said second conductive shell and member being hermetically joined to said second dielectric plate and respectively hermetically joined to and electrically connected to said first conductive shell and tube.

2. In a hermetically sealed capacitor, capacitive means comprising a stack of dielectric plates, each plate having an aperture therethrough and each plate being metalized to provide two separate conductive elements, a first of said conductive elements extending over the peripheral edge of each plate, the second of said conductive elements extending over the inner edge of each plate, a first metal shell surrounding said capacitive means and electrically connected to said first conductive element, a first metal eyelet extending through the aperture in said capacitive means and electrically connected to said second conductive elements, a first ceramic plate hermetically joined to corresponding ends of said first shell and said first eyelet to form a first envelope section, the other ends of said first shell and said first eyelet being flanged over to secure said capacitive means within said first envelope section, a second metal shell surrounding said first shell and electrically connected thereto, a second metal eyelet positioned within said first eyelet and electrically connected thereto, a second ceramic plate positioned in juxtaposition with said flanged over end of said first shell and said first eyelet, said second ceramic plate hermetically joined to said second shell and said second eyelet to form a second envelope section, said second shell and said second eyelet being respectively hermetically joined to said first shell and said first eyelet to join said second envelope section to said first envelope section.

3. In a hermetically sealed capacitor, capacitive means comprising a plurality of electrically conductive elements respectively separated by a plurality of dielectric elements, an aperture extending through said capacitive means, a first inner conductive member positioned within said aperture and electrically connected to some of said conductive elements, said first inner conductive member having an aperture extending therethrough, a first outer conductive member surrounding said capacitive means and electrically connected to other of said conductive elements, a first refractory dielectric member hermetically joined to corresponding ends of said first inner conductive member and said outer conductive member to form a first envelope section that encases said capacitive means, the other ends of said first inner conductive member and said first outer conductive member being flanged over to secure said capacitive means within said first envelope section, a second inner conductive member positioned within said aperture in said first inner conductive member, a second outer conductive member surrounding said first outer conductive member, a second refractory dielectric member positioned in juxtaposition with said flanged over end of said first inner conductive member and said first outer conductive member, said second dielectric member hermetically joined to said second inner conductive member and said second outer conductive member to form a second envelope section that encases said first envelope section, said second inner conductive member and said second outer conductive member being respectively electrically and hermetically joined to said first inner conductive member and said first outer conductive member to hermetically enclose said capacitive means.

4. In a hermetically sealed capacitor, capacitive means comprising a pair of electrically conductive elements separated by a dielectric element, an aperture extending through said capacitive means, first inner conductive means positioned within said aperture and electrically connected to one of said conductive elements, said first inner means having an aperture extending therethrough, first outer conductive means surrounding said capacitive means and electrically connected to the other of said conductive elements, first refractory dielectric means hermetically joined to one end of said first inner conductive means and said first outer conductive means, second refractory dielectric means positioned in juxtaposition with the other ends of said first inner conductive means and said first outer conductive means, second inner conductive means positioned within said aperture in said first inner conductive means and electrically connected thereto, second outer conductive means surrounding said first outer conductive means and electrically connected thereto, said second inner conductive means and said second outer conductive means hermetically joined to said dielectric means and hermetically joined to said first inner conductive means and said first outer conductive means.

References Cited by the Examiner

UNITED STATES PATENTS

| | | | |
|---|---|---|---|
| 1,656,431 | 1/28 | Edenburg | 317—261 |
| 1,754,268 | 4/30 | Dubilier | 317—261 |
| 2,430,433 | 11/47 | Minnium | 317—261 |
| 2,759,155 | 8/56 | Hackenberg | 317—242 |

FOREIGN PATENTS 1,115,671  1/56  France.

JOHN F. BURNS, *Primary Examiner.*

SAMUEL BERNSTEIN, WALTER L. CARLSON,
*Examiners.*